US012572743B2

(12) United States Patent
Fu

(10) Patent No.: US 12,572,743 B2
(45) Date of Patent: Mar. 10, 2026

(54) SYSTEM AND METHOD FOR UNSUPERVISED IDENTIFICATION OF OMITTED INFORMATION FROM A MACHINE LEARNING MODEL-GENERATED SUMMARY

(71) Applicant: Microsoft Technology Licensing, LLC, Redmond, WA (US)

(72) Inventor: Zhongkai Fu, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 258 days.

(21) Appl. No.: 18/189,318

(22) Filed: Mar. 24, 2023

(65) Prior Publication Data

US 2024/0320430 A1    Sep. 26, 2024

(51) Int. Cl.
| | |
|---|---|
| *G06F 40/284* | (2020.01) |
| *G06F 40/117* | (2020.01) |
| *G06F 40/166* | (2020.01) |
| *G06N 3/0455* | (2023.01) |

(52) U.S. Cl.
CPC .......... *G06F 40/284* (2020.01); *G06F 40/117* (2020.01); *G06F 40/166* (2020.01); *G06N 3/0455* (2023.01)

(58) Field of Classification Search
CPC .... G06F 40/284; G06F 40/117; G06F 40/166; G06F 40/30; G06N 3/0455
See application file for complete search history.

(56) References Cited

U.S. PATENT DOCUMENTS

| | | | | |
|---|---|---|---|---|
| 2018/0240538 A1* | 8/2018 | Koll | ........................ | G16H 10/60 |
| 2019/0272902 A1* | 9/2019 | Vozila | ................... | G06F 40/169 |
| 2021/0098098 A1* | 4/2021 | Pinto | ................... | G06F 16/7867 |
| 2021/0390127 A1 | 12/2021 | Fox | | |

OTHER PUBLICATIONS

International Search Report and Written Opinion received for PCT Application No. PCT/US2024/019319, Jun. 24, 2024, 11 pages.
International Preliminary Report on Patentability (Chapter I) received for PCT Application No. PCT/US2024/019319, Oct. 9, 2025, 06 pages.

* cited by examiner

*Primary Examiner* — Darioush Agahi
(74) *Attorney, Agent, or Firm* — Foley IP Law, PLLC

(57) ABSTRACT

A method, computer program product, and computing system for identifying a portion of a transcript associated with a particular category. A segment from the transcript is aligned with a segment from a model-generated summary of the transcript. A portion of the transcript omitted from the model-generated summary is identified based upon, at least in part, the identified portion of the transcript associated with the particular category and the aligned segments from the transcript and the model-generated summary.

20 Claims, 3 Drawing Sheets

10

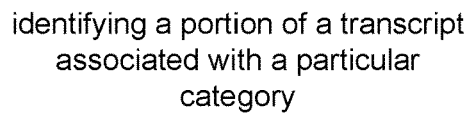

identifying a portion of a transcript associated with a particular category

100 labeling each portion of the transcript associated with the particular category

106 training a sequence-to-sequence model with a training transcript and corresponding training summary

108 providing the transcript as input to an encoder of the sequence-to-sequence model and providing the model-generated summary to a decoder of the sequence-to-sequence model

110 aligning a segment from the transcript with a segment from a model-generated summary of the transcript

102 generating an alignment score between a plurality of tokens of the transcript and a plurality of corresponding tokens of the model-generated summary based upon, at least in part, copy probabilities and attention weights between the plurality of tokens of the transcript and the plurality of corresponding tokens of the model-generated summary

112 comparing each alignment score against an alignment threshold

114 identifying a portion of the transcript omitted from the model-generated summary based upon, at least in part, the identified portion of the transcript associated with the particular category and the aligned segments from the transcription and the model-generated summary

104 generating an alignment score between segments of the transcript and corresponding tokens of the model-generated summary based upon, at least in part, a number of aligned tokens in each segment of the model-generated summary and a total number of tokens in each segment of the model-generated summary

SYSTEM AND METHOD FOR UNSUPERVISED IDENTIFICATION OF OMITTED INFORMATION FROM A MACHINE LEARNING MODEL-GENERATED SUMMARY

BACKGROUND

Transcripts are useful to record meetings, discussions, or other collaborative events. With the ability to process transcripts, machine learning models can summarize portions of the transcripts and/or populate other documents or records automatically using transcripts. For example, medical professionals often generate electronic health records (EHRs) from conversations between them and their patients. This process may be performed automatically by using machine learning models to generate EHR from transcripts. However, transcripts generally include content that is immaterial or unrelated to a particular topic or category (e.g., medical information in the example of an EHR). Accordingly, machine learning models identify the transcript content that is relevant to a particular task and filter the less relevant data from the summary or other populated record. However, this model-driven filtering can inadvertently omit important or relevant information.

BRIEF DESCRIPTION OF THE DRAWINGS

FIG. 1 is a flow chart of one implementation of the omitted information identification process;

Like reference symbols in the various drawings indicate like elements.

DETAILED DESCRIPTION OF THE PREFERRED EMBODIMENTS

As will be discussed in greater detail below, implementations of the present disclosure provide unsupervised identification of transcript content omitted from a model-generated summary of the transcript by identifying portions of the transcript associated with a particular topic or category of interest and aligning segments from the transcript with corresponding segments of the model-generated summary. For example, conventional approaches using different natural language process methods, such as text classifier, sequence labeling, questions and answers, and others. However, these methods are supervised and require a significant amount of annotated data set for model training and testing. Data set annotation tasks are expensive, because annotators must read a transcript and the corresponding machine summarized note at first, and then check whether each portion is presented in the summary. By contrast, implementations of the present disclosure provide unsupervised identification of omitted content by identifying each turn of a transcript associated with a particular topic or category, aligning each segment from the transcript and the model-generated summary, and identifying the turn of the transcript that are associated with the particular category but do not have corresponding aligned text in the model-generated summary.

The details of one or more implementations are set forth in the accompanying drawings and the description below.

Other features and advantages will become apparent from the description, the drawings, and the claims.

Figure 2:
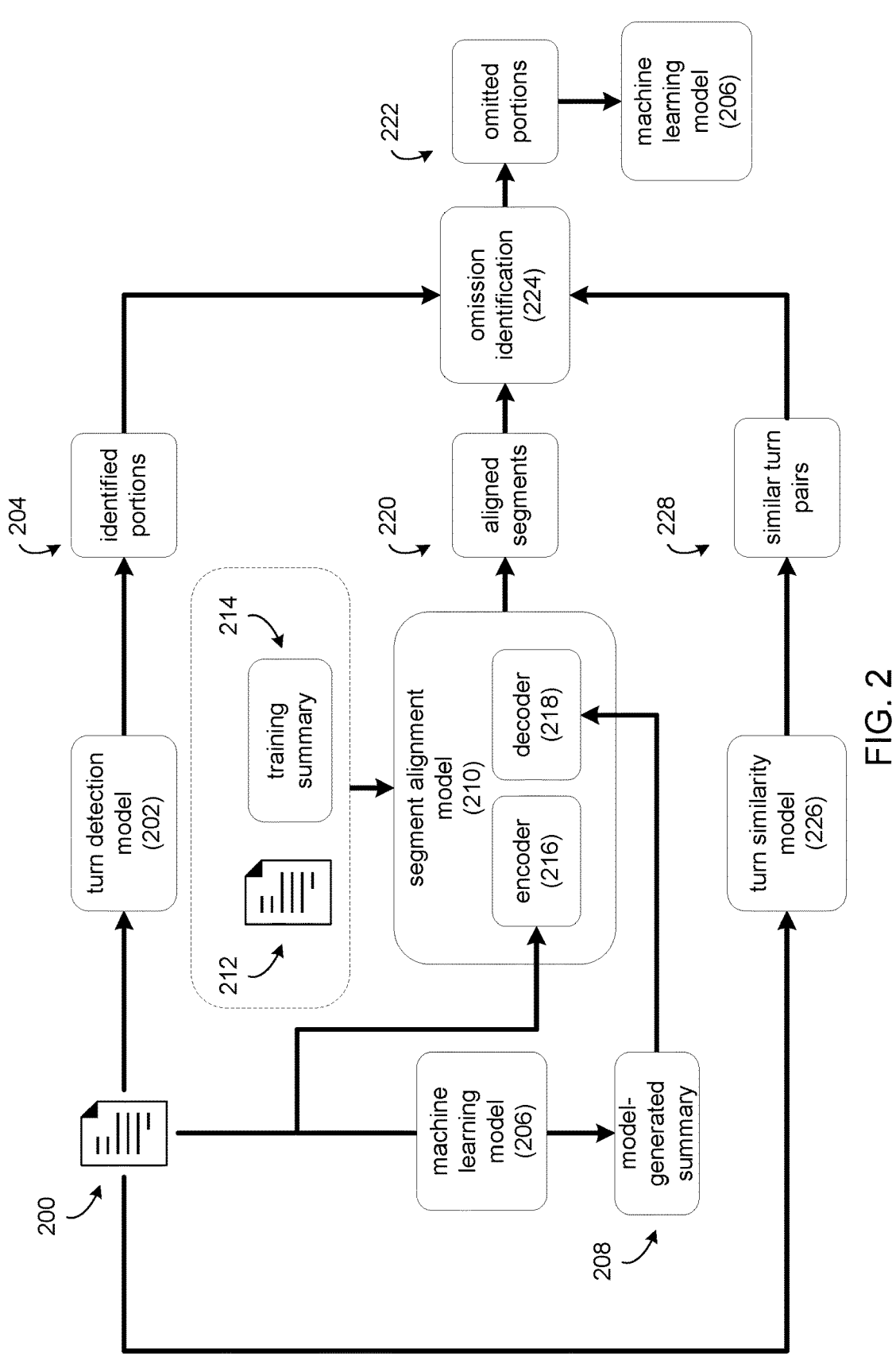
FIG. 2 is a diagrammatic view of the omitted information identification process.
Figure 3:
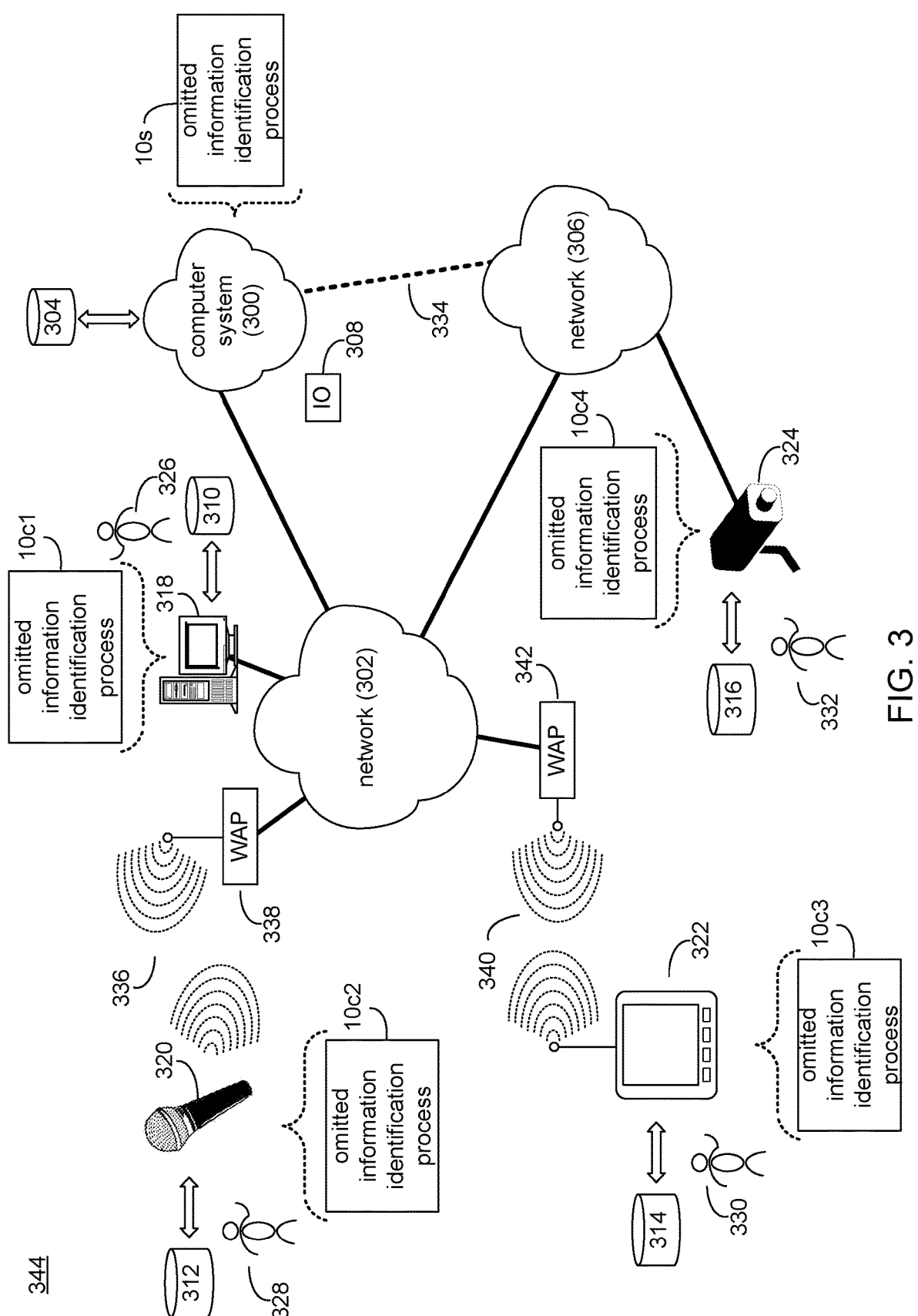
FIG. 3 is a diagrammatic view of a computer system and the omitted information identification process coupled to a distributed computing network.

The Omitted Information Identification Process:

Referring also to FIGS. 1-3, omitted information identification process 10 identifies 100 a portion of a transcript associated with a particular category. A segment from the transcript is aligned 102 with a segment from a model-generated summary of the transcript. A portion of the transcript omitted from the model-generated summary is identified 104 based upon, at least in part, the identified portion of the transcript associated with the particular category and the aligned segments from the transcript and the model-generated summary.

In some implementations, omitted information identification process 10 identifies 100 a portion of a transcript associated with a particular category. A transcript is a record, typically in written form, of a verbal communication involving one or more individuals or speakers. For example, suppose two individuals are collaborating using an online communication service (e.g., Microsoft® Teams). Suppose that during the discussion, one of the individuals desires to record a transcript of their meeting. Accordingly, a transcript includes a representation of each individual's contributions to the discussion. In some implementations, a transcript includes textual representations of each utterance from each individual generated using an automated speech recognition (ASR) system. As will be discussed in greater detail below, various portions (e.g., turns, paragraphs, sentences, phrases, words, etc.) address or concern particular categories. In one example, a particular category of a portion of a transcript concerns medical information. In another example, a particular category of a portion of a transcript concerns news information. In another example, a particular category of a portion of a transcript concerns legal information. As such, it will be appreciated that portions of the transcript can be associated with various domains.

As will be discussed in greater detail below, transcripts are summarized by machine learning models into model-generated summaries. During the summarization, information that the model determines is relevant (e.g., concerns a relevant category) is represented in the summary while irrelevant information (e.g., does not concern a relevant category) is omitted. As the determination of relevant information is a function of training (e.g., training data provided to the machine learning model generating the summary of the transcript), implementations of the present disclosure identify omitted information to help improve the performance of these machine learning models (e.g., by providing training data that addresses omitted information).

In some implementations, the portion includes a turn from the transcript. A turn is a single instance of communication associated with a unique individual. For example, suppose omitted information identification process 10 processes a transcript (e.g., transcript 200) of a conversation between two individuals. In this example, suppose transcript 200 concerns an appointment between a doctor and a patient as shown below:

Transcript 200:

[doctor] next is [last name] and her date of birth is [date of birth]. Patient is a [age]-year-old female present at the clinic today for follow-up regarding dizziness, headaches, as well as anxiety. She is also working with a neurologist. She is taking Elavil Cymbalta.

[patient] yes, before I forget, I went back well first I had my appointment on [appointment date] with my neurologist because I was still having headaches and still kind of you know.

[doctor] little woozy

[patient] yeah little woozy. She increased the amitriptyline to 30.

In the example above, each instance of communication from the doctor and each instance of communication from the patient represent separate turns. Accordingly, the above example includes two turns associated with the doctor and two turns associated with the patient. In some implementations, omitted information identification process 10 uses a turn detection model (e.g., turn detection model 202) to identify 100 each turn of the transcript (e.g., transcript 200) and a category associated with each turn. Turn detection model 202 is a software model (e.g., a machine learning model) that processes transcript 200 to identify each turn and the category for that turn. In some implementations, turn detection model 202 processes each element or word of each turn and generates a probability score for a plurality of potential categories. For example, when processing each portion of the transcript (e.g., each turn of transcript 200), omitted information identification process 10 maps the words or tokens of each turn to words or tokens associated with a plurality of potential categories (e.g., medical, legal, academic, news, etc. and subcategories within medical, legal, academic, etc. fields). In some implementations, words or token associated with each category of the plurality of potential categories are defined in a plurality of data structures locally accessible to omitted information identification process 10, in remote cloud data structures, and/or Internet-based data structures.

In some implementations, omitted information identification process 10 compares the words or tokens from each turn against predefined thresholds for each category. For example, a threshold of one word or token is used when the presence of a particular category of information (e.g., medical information) is important to include in a model-generated summary of the transcript. In another example, a predefined threshold of words or tokens (e.g., a number of words or tokens or percentage of words or tokens) is used to determine when the presence of a sufficient amount of words or tokens indicates that the turn is associated with a given category. In this manner, a turn may be associated with multiple categories but inclusion of the threshold amount of words or tokens allows omitted information identification process 10 to identify 100 the portion of the transcript associated with the particular category.

In some implementations, identifying 100 the portion of the transcript associated with the particular category includes labeling 106 each portion of the transcript associated with the particular category. Labeling 106 each portion of the transcript associated a particular category includes flagging or marking each portion directly or indirectly (e.g., in a separate data structure with separate labels mapping to each portion) with a label representative of the particular category. As discussed above and in some implementations, labeling 106 each portion of the transcript includes labeling each portion with labels specific to particular subcategories. Referring again to the above transcript, omitted information identification process 10 labels 106 each turn as follows:

[doctor] next is [last name] and her date of birth is [date of birth]. Patient is a [age]-year-old female present at the clinic today for follow-up regarding dizziness, headaches, as well as anxiety. She is also working with a neurologist. She is taking Elavil Cymbalta. [MEDICAL]

[patient] yes, before I forget, I went back well first I had my appointment on [appointment date] with my neurologist because I was still having headaches and still kind of you know. [MEDICAL]

[doctor] little woozy

[patient] yeah little woozy. She increased the amitriptyline to 30. [MEDICAL]

As shown above, three of the four turns are labeled with medical labels based on the words of each turn. In some implementations, subcategory labels are used to identify particular subcategories within the medical category. For example, subcategories associated with prescriptions, prior medical history, diagnosis information, etc. In some implementations, omitted information identification process 10 extends labeling of categories to each sentence or word of a turn. In this manner, the granularity of the labeling to identify sentences or words of a turn associated with a particular category.

As shown in FIG. 2, turn detection model 202 processes transcript 200 to identify 100 a portion associated with a particular category (e.g., identified portions 204). As discussed above and in some implementations, the identified portions (e.g., identified portions 204) are turns with labels indicative of the category associated with each turn.

In some implementations, omitted information identification process 10 aligns 102 a segment from the transcript with a segment from a model-generated summary of the transcript. As discussed above, a model-generated summary of a transcript is a summary generated by a machine learning model. For example, suppose a transcript (e.g., transcript 200) includes textual representations of a conversation between a doctor and a patient during a medical appointment. In this example, transcript 200 may include important medical information but lacks the formatting of medical records. Accordingly, a machine learning model (e.g., machine learning model 206) is used to process transcript 200 into a corresponding model-generated summary of the transcript (e.g., model-generated summary 208). In some implementations, model-generated summary 208 is an electronic health record (EHR) and the machine learning model populate model-generated summary 208 using transcript 200. However and as discussed above, the machine learning model that generates model-generated summary 208 may omit important medical information that should be used to populate the corresponding EHR.

In some implementations, omitted information identification process 10 uses teacher forcing alignment to align 102 a segment from the transcript with a segment from a model-generated summary of the transcript to identify omitted portions from the transcript. Teacher forcing alignment is a methodology used in machine learning, specifically in the context of training sequence-to-sequence models. During the training process of a teacher forcing alignment model, the correct output sequence is fed back into the machine learning model as input for the next step, instead of using the output predicted by the model itself as the input for the next step. This helps the machine learning model to "learn" more quickly and more accurately compared to conventional approaches because the machine learning model has access to the correct output at each step. As will be discussed in greater detail below, omitted information identification process 10 uses segments of a natural/training summary (e.g., the "correct output") as inputs to a segment alignment model (e.g., segment alignment model 210) to train segment alignment model 210 to align 102 segments of transcript 200 with corresponding segments from model-generated summary 208.

In some implementations, aligning 102 the segment from the transcript with the segment from the model-generated summary includes training 108 a sequence-to-sequence model with a training transcript and corresponding training summary. A segment is a sentence or grouping of words or tokens from the transcript or the model-generated summary. In some implementations and as will be described in greater detail below, omitted information identification process 10 identifies portions of a transcript that are omitted from a model-generated summary by aligning each segment or sentence from the transcript to the segments or sentences of the model-generated summary. For example, suppose a model-generated summary includes each segment or sentence from a corresponding transcript. In this example, the probability that the model-generated summary has omitted segments or sentences from the transcript is very low. Accordingly, omitted information identification process 10 trains 108 a sequence-to-sequence model (e.g., segment alignment model 210) with a training transcript (e.g., training transcript 212) and corresponding training summary (e.g., training summary 214). Training transcript 212 and corresponding training summary 214 are labeled elements of a parallel data set that are used by segment alignment model 210 to know which turns of training transcript 212 correspond to sentences of training summary 214.

In one example, segment alignment model 210 is a transformer-based summarization model with pointer-generator mechanism from transcript to note. A transformer-based summarization model is a type of machine learning model for automatic text summarization using a transformer architecture. A transformer architecture is a type of neural network that uses self-attention mechanisms to process input sequences. Self-attention allows the sequence-to-sequence model to attend to different parts of the input sequence at different levels of granularity. In this example, segment alignment model 210 includes an encoder and a decoder. The encoder processes input text and produces a set of hidden representations that capture the key or important information in the input. The decoder generates the summary based on the hidden representations produced by the encoder.

In some implementations, aligning 102 the segment from the transcript with the segment from the model-generated summary includes providing 110 the transcript as input to an encoder of the sequence-to-sequence model and providing the model-generated summary to a decoder of the sequence-to-sequence model. For example and referring again to FIG. 2, omitted information identification process 10 provides transcript 200 as an input to an encoder (e.g., encoder 216) of segment alignment model 210 and provides model-generated summary 208 as a prompt to a decoder (e.g., decoder 218) of segment alignment model 210. In this example, transcript 200 and model-generated summary 208 are from the same data set (i.e., model-generated summary 208 corresponds to transcript 200) for alignment model training.

In some implementations, aligning 102 the segment from the transcript with the segment from the model-generated summary includes generating 112 an alignment score between a plurality of tokens of the transcript and a plurality of corresponding tokens of the model-generated summary based upon, at least in part, copy probabilities and attention weights between the plurality of tokens of the transcript and the plurality of corresponding tokens of the model-generated summary. For example, omitted information identification process 10 aligns 102 segments from transcript 200 with segments from model-generated summary 208 by processing tokens of each turn of transcript 200 and model-generated summary 208 at run-time or inference time using segment alignment model 210. In some implementations, segment alignment model 210 provides a token (e.g., a word or portion of a word) from transcript 200 as an input to encoder 216. Segment alignment model 210 runs a single step (i.e., runs over one token), then decoder 218 outputs a next token of each prompted token along with attention weights and copy probabilities. The attention weights are shown below in the matrix of Equation 1:

$$\text{attention weights} = \begin{array}{c|ccccc} & S_1 & S_2 & S_3 & \dots & S_m \\ T_1 & W_{11} & W_{12} & W_{13} & \dots & W_{1m} \\ T_2 & W_{21} & W_{22} & W_{23} & \dots & W_{2m} \\ T_3 & W_{31} & W_{32} & W_{33} & \dots & W_{3m} \\ \vdots & \vdots & \vdots & \vdots & \ddots & \vdots \\ T_n & W_{n1} & W_{n2} & W_{n3} & \dots & W_{nm} \end{array} \quad (1)$$

In the above example, $S_m$ are source tokens in transcript 200, $T_n$ are model output tokens in model-generated summary 208, and $W_{nm}$ are attention weights generated by omitted information identification process 10. An attention weight is a numerical representation (e.g., a value between 0.0 and 1.0) of the amount of attention segment alignment model 210 pay to source tokens $S_m$ in transcript 200 when segment alignment model 210 outputs token $T_n$ for model-generated summary 208. The higher $W_{nm}$ score is, the more attention that segment alignment model 210 pays to $S_m$ in transcript 200 while generating $T_n$ for model-generated summary 208.

A copy probability is a probability value (e.g., value between 0.0 and 1.0) that when segment alignment model 210 tries to output a new token for model-generated summary 208, segment alignment model 210 will copy the new token from source token $S_m$ in transcript 200, or, rather, generate the new token from its language model. For example, omitted information identification process 10 generates copy probabilities that each new token of model-generated summary 208 is copied from transcript 200.

In some implementations, omitted information identification process 10 generates 112 an alignment score between a plurality of tokens of the transcript and a plurality of corresponding tokens of the model-generated summary. An alignment score between token(s) of the transcript and token(s) of the model-generated summary is a value (e.g., a value between 0.0 and 1.0) indicating the probability that these tokens are aligned between the transcript and the model-generated summary. In some implementations, omitted information identification process 10 generates 112 the alignment score on a token level as shown below in Equation 2:

$$\text{alignment score}_{token} = [\text{attention weights}_{token}] * [\text{copy probabilities}_{token}] \quad (2)$$

In some implementations, aligning 102 the segment from the transcript with the segment from the model-generated summary includes comparing 114 each alignment score against an alignment threshold. For example, every output token $T_n$ has m alignment scores from $S_1$ to $S_m$ where m is the number of source tokens in transcript. If all of the alignment scores for a particular output token of the model-generated summary are less than a predefined alignment threshold when each alignment score is compared 114 with the alignment threshold, there is not an aligned source token in the transcript. However, if an alignment score for the particular output token of the model-generated summary meets or exceeds the predefined alignment threshold, the source token $S_m$ with the highest alignment score as the aligned token with the output token $T_n$ and create alignment relationship for them.

In some implementations, aligning 102 the segment from the transcript with the segment from the model-generated summary includes generating 116 an alignment score between segments of the transcript and corresponding tokens of the model-generated summary based upon, at least in part, a number of aligned tokens in each segment of the model-generated summary and a total number of tokens in each segment of the model-generated summary. For example, the alignment scores discussed above are on token level. Omitted information identification process 10 extends this to sentence and turn level by leveraging lexical/turn/punctuation information in the model-generated summary and the transcript to generate sentence and turn alignment between the transcript and the model-generated summary. For any pair of aligned sentences or turns, its alignment score is generated 116 as shown below in Equation 3:

$$(3)$$

sentence/turn alignment score =

$$\left[ \frac{\text{number of tokens with alignment score} \geq 0}{\text{total number of tokens in segment of model-generated summary}} \right]$$

In some implementations, the number of tokens with an alignment score greater than zero also includes tokens that are not "stopwords". A stopword is a common, but meaningless word, such as "the", "a", "as" and others in the context of aligning segments (e.g., sentences or turns) of transcripts and corresponding model-generated summaries. As shown in FIG. 2, segment alignment model 210 aligns 102 segments from transcript 200 and model-generated summary 208 to generate a plurality of aligned segments (e.g., aligned segments 220). An example of the aligned turns in transcript 200 and sentences of model-generated summary 208 is shown below:

[doctor] next is [last name] and her date of birth is [date of birth]. Patient is a [age]-year-old female present at the clinic today for follow-up regarding dizziness, headaches, as well as anxiety. She is also working with a neurologist. She is taking Elavil Cymbalta.

HPI_0[20]: patient is a [age]-year-old female who presents to the clinic today for follow up regarding dizziness, headaches, as well as anxiety.

HPI_1[7]: She is also working with a neurologist.

HPI_2[6]: she is taking Elavil and Cymbalta.

[patient] yes, before I forget, I went back well first I had my appointment on [appointment date] with my neurologist because I was still having headaches and still kind of you know.

HPI_3[19]: Patient states that she had her appointment on [appointment date] with her neurologist because she was still having headaches and still felt woozy.

[doctor] little woozy

[patient] yeah little woozy. She increased the amitriptyline to 30.

HPI_4[6]: She was increased the amitriptyline to 30 mg and she is still taking the Cymbalta 30 mg. She states that she still had a few headaches because she was told that it would take a while for that to kick in.

As shown above, for each turn of transcript 200, if there is a sentence in model-generated summary 210 aligned with it, it will show "HPI_x[y]: sentence in model-generated summary" where "x" represents the xth sentence in the model-generated summary, and "y" represents the number of tokens aligned in this sentence. The higher y is, the greater the confidence for the alignment. For example, the first and third sentences (e.g., "HPI_0" and "HPI_3") have 20 and 19 aligned tokens, respectively. As such, these are highly aligned segments. In one example, omitted information identification process 10 identifies aligned segments 216 by comparing the sentence/turn alignment score of Equation 3 against a predefined alignment threshold. In another example, omitted information identification process 10 identifies aligned segments 220 by comparing the number of tokens aligned in each sentence of the model-generated summary against a predefined alignment threshold.

In some implementations, omitted information identification process 10 identifies 104 a portion of the transcript omitted from the model-generated summary based upon, at least in part, the identified portion of the transcript associated with the particular category and the aligned segments from the transcript and the model-generated summary. For example, omitted information identification process 10 processes the identified portions from the transcript (e.g., identified portions 204 of transcript 200) and the aligned segments from the transcript and model-generated summary (e.g., aligned segments 220 including turns of transcript 200 aligned with sentences of model-generated summary 208) to identify 104 omitted portions (e.g., omitted portions 222). As shown in FIG. 2, the identification of omitted portions 222 is represented by omission identification 224. In some implementations, omission identification 224 represents a machine learning model configured to process identified portions 204, aligned segments 220, and/or turn-segment similarity to identify 104 omitted portions 222.

In some implementations, identifying 104 the omitted portion includes iterating through each turn in the transcript. If the turn (e.g., identified portion 204) is labeled with a particular category, but is not aligned to any sentence in model-generated summary 208, identified portion 204 is an omission candidate turn. Referring again to FIG. 2, omitted information identification process 10 performs turn sentence similarity (e.g., using turn similarity model 226) to determine whether each omission candidate turn is similar to any turn aligned with a sentence in model-generated summary 208. A turn similarity model is a machine learning model or other software component that processes a transcript as an input to determine if turns of the transcript are similar to one another. The turn similarity model provides a list of turns of a transcript that are similar (e.g., represented in FIG. 2 as similar turn-segment pairs 228). In some implementations, turn similarity model 226 uses an nGram method to compare multiple turns. For two turns, if the overlapping ratio of their tokens is above e.g., 70%, then they are similar turns. For example, similar turn pairs may include two turns from transcript 200 that are similar as defined by turn similarity model 226. Accordingly, omission identification model 224 determines whether an omission candidate turn is similar to another turn that is associated with a particular category. If no similar turn exists in transcript 200, omitted information identification process 10 identifies 104 the omission candidate turn as an omitted portion (e.g., an omitted turn or omitted portion 222).

In some implementations and in response to identifying 104 omitted portions 222, omitted information identification process 10 trains the machine learning model (e.g., machine learning model 206) that generates model-generated summaries from transcripts with omitted portions 222. In this manner, omitted information identification process 10 corrects the erroneous omission of omitted portions 222 from future model-generated summaries. As discussed above, because the process for identifying 104 omitted portions 222 is unsupervised, omitted information identification process 10 is able to automatically (e.g., without human intervention or supervision) adjust machine learning model 206 to account for omitted portions 222 in subsequent summarizations of transcripts.

System Overview:

Referring to FIG. 3, there is shown omitted information identification process 10. Omitted information identification process 10 may be implemented as a server-side process, a client-side process, or a hybrid server-side/client-side process. For example, omitted information identification process 10 may be implemented as a purely server-side process via omitted information identification process 10s. Alternatively, omitted information identification process 10 may be implemented as a purely client-side process via one or more of omitted information identification process 10c1, omitted information identification process 10c2, omitted information identification process 10c3, and omitted information identification process 10c4. Alternatively still, omitted information identification process 10 may be implemented as a hybrid server-side/client-side process via omitted information identification process 10s in combination with one or more of omitted information identification process 10cl, omitted information identification process 10c2, omitted information identification process 10c3, and omitted information identification process 10c4.

Accordingly, omitted information identification process 10 as used in this disclosure may include any combination of omitted information identification process 10s, omitted information identification process 10c1, omitted information identification process 10c2, omitted information identification process 10c3, and omitted information identification process 10c4.

Omitted information identification process 10s may be a server application and may reside on and may be executed by a computer system 300, which may be connected to network 302 (e.g., the Internet or a local area network). Computer system 300 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a mini computer, a mainframe computer, a RAID device and a NAS system. The various components of computer system 300 may execute one or more operating systems.

The instruction sets and subroutines of omitted information identification process 10s, which may be stored on storage device 304 coupled to computer system 300, may be executed by one or more processors (not shown) and one or more memory architectures (not shown) included within computer system 300. Examples of storage device 304 may include but are not limited to: a hard disk drive; a RAID device; a random access memory (RAM); a read-only memory (ROM); and all forms of flash memory storage devices.

Network 302 may be connected to one or more secondary networks (e.g., network 304), examples of which may include but are not limited to: a local area network; a wide area network; or an intranet, for example.

Various IO requests (e.g., IO request 308) may be sent from omitted information identification process 10s, omitted information identification process 10c1, omitted information identification process 10c2, omitted information identification process 10c3 and/or omitted information identification process 10c4 to computer system 300. Examples of IO request 308 may include but are not limited to data write requests (i.e., a request that content be written to computer system 300) and data read requests (i.e., a request that content be read from computer system 300).

The instruction sets and subroutines of omitted information identification process 10c1, omitted information identification process 10c2, omitted information identification process 10c3 and/or omitted information identification process 10c4, which may be stored on storage devices 310, 312, 314, 316 (respectively) coupled to client electronic devices 318, 320, 322, 324 (respectively), may be executed by one or more processors (not shown) and one or more memory architectures (not shown) incorporated into client electronic devices 318, 320, 322, 324 (respectively). Storage devices 310, 312, 314, 316 may include but are not limited to: hard disk drives; optical drives; RAID devices; random access memories (RAM); read-only memories (ROM), and all forms of flash memory storage devices. Examples of client electronic devices 318, 320, 322, 324 may include, but are not limited to, personal computing device 318 (e.g., a smart phone, a personal digital assistant, a laptop computer, a notebook computer, and a desktop computer), audio input device 320 (e.g., a handheld microphone, a lapel microphone, an embedded microphone (such as those embedded within eyeglasses, smart phones, tablet computers and/or watches) and an audio recording device), display device 322 (e.g., a tablet computer, a computer monitor, and a smart television), machine vision input device 324 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 326, 328, 330, 332 may access computer system 300 directly through network 302 or through secondary network 306. Further, computer system 300 may be connected to network 302 through secondary network 306, as illustrated with link line 334.

The various client electronic devices (e.g., client electronic devices 318, 320, 322, 324) may be directly or indirectly coupled to network 302 (or network 306). For example, personal computing device 318 is shown directly coupled to network 302 via a hardwired network connection.

Further, machine vision input device 324 is shown directly coupled to network 306 via a hardwired network connection. Audio input device 322 is shown wirelessly coupled to network 302 via wireless communication channel 336 established between audio input device 320 and wireless access point (i.e., WAP) 338, which is shown directly coupled to network 302. WAP 336 may be, for example, an IEEE 802.11a, 802.11b, 802.11g, 802.11n, Wi-Fi, and/or Bluetooth™ device that is capable of establishing wireless communication channel 336 between audio input device 320 and WAP 338. Display device 322 is shown wirelessly coupled to network 302 via wireless communication channel 340 established between display device 322 and WAP 342, which is shown directly coupled to network 302.

The various client electronic devices (e.g., client electronic devices 318, 320, 322, 324) may each execute an operating system, wherein the combination of the various client electronic devices (e.g., client electronic devices 318, 320, 322, 324) and computer system 300 may form modular system 344.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

receiving a transcript of a conversation;

generating, by a summarization machine learning (ML) model, a model-generated summary of the transcript, the model-generated summary for populating an electronic health record (EHR);

identifying a portion of the transcript associated with a particular category of relevance to the EHR;

aligning, by a sequence-to-sequence ML model, segments from the transcript with segments from the model-generated summary; and identifying, within the portion of the transcript, content omitted from the model-generated summary based upon, at least in part, the aligned segments from the transcript and the model-generated summary, the content omitted from the model-generated summary being material to the EHR; and adjusting, via an iterative training process, the summarization ML model to account for the content omitted from the model-generated summary when generating future model-generating summaries, wherein the summarization ML model is configured to generate the future model-generated summaries for use in populating EHRs.

2. The computer-implemented method of claim 1, wherein the particular category concerns one or more of medical information, news information, and legal information.

3. The computer-implemented method of claim 1, wherein identifying the portion of the transcript associated with the particular category includes labeling each portion of the transcript associated with the particular category.

4. The computer-implemented method of claim 1, wherein aligning the segments from the transcript with the segments from the model-generated summary includes training a sequence-to-sequence model with a training transcript and corresponding training summary.

5. The computer-implemented method of claim 4, wherein aligning the segments from the transcript with the segments from the model-generated summary includes providing the transcript as input to an encoder of the sequence-to-sequence model and providing the model-generated summary to a decoder of the sequence-to-sequence model.

6. The computer-implemented method of claim 5, wherein aligning the segments from the transcript with the segments from the model-generated summary includes generating an alignment score between a plurality of tokens of the transcript and a plurality of corresponding tokens of the model-generated summary based upon, at least in part, copy probabilities and attention weights between the plurality of tokens of the transcript and the plurality of corresponding tokens of the model-generated summary.

7. The computer-implemented method of claim 6, wherein aligning the segments from the transcript with the segments from the model-generated summary includes generating an alignment score between segments of the transcript and corresponding tokens of the model-generated summary based upon, at least in part, a number of aligned tokens in each segments of the model-generated summary and a total number of tokens in each segments of the model-generated summary.

8. A computing system comprising:

at least one processor; and a memory storing programming instructions for execution by the at least one processor, the programming instructions, upon execution by the at least one processor, causing the computing system to perform the following operations:

receiving a transcript of a conversation;

generating, by a summarization machine learning (ML) model, a model-generated summary of the transcript, the model-generated summary for populating an electronic health record (EHR);

identifying a portion of the transcript associated with a particular category of relevance to the EHR;

aligning, by a sequence-to-sequence ML model, segments from the transcript with segments from the model-generated summary; and identifying, within the portion of the transcript, content omitted from the model-generated summary based upon, at least in part, the aligned segments from the transcript and the model-generated summary, the content omitted from the model-generated summary being material to the EHR; and adjusting, via an iterative training process, the summarization ML model to account for the content omitted from the model-generated summary when generating future model-generating summaries, wherein the summarization ML model is configured to generate the future model-generated summaries for use in populating EHRs.

9. The computing system of claim 8, wherein identifying the portion of the transcript associated with the particular category includes labeling each portion of the transcript associated with the particular category.

10. The computing system of claim 8, wherein aligning the segments from the transcript with the segments from the model-generated summary includes training a sequence-to-sequence model with a training transcript and corresponding training summary.

11. The computing system of claim 10, wherein aligning the segments from the transcript with the segments from the model-generated summary includes providing the transcript as input to an encoder of the sequence-to-sequence model and providing the model-generated summary to a decoder of the sequence-to-sequence model.

12. The computing system of claim 11, wherein aligning the segments from the transcript with the segments from the model-generated summary includes generating an alignment score between a plurality of tokens of the transcript and a plurality of corresponding tokens of the model-generated summary based upon, at least in part, copy probabilities and attention weights between the plurality of tokens of the transcript and the plurality of corresponding tokens of the model-generated summary.

13. The computing system of claim 12, wherein aligning the segments from the transcript with the segments from the model-generated summary includes comparing each alignment score against an alignment threshold.

14. The computing system of claim 12, wherein aligning the segments from the transcript with the segments from the model-generated summary includes generating an alignment score between segments of the transcript and corresponding tokens of the model-generated summary based upon, at least in part, a number of aligned tokens in each of the segments of the model-generated summary and a total number of tokens in each of the segments of the model-generated summary.

15. A computer program product residing on a non-transitory computer readable medium storing programming instructions for execution by at least one processor of a computing system, the programming instructions, upon execution by the processor, causing the computing system to perform the following operations:

receiving a transcript of a conversation;

generating, by a summarization machine learning (ML) model, a model-generated summary of the transcript, the model-generated summary for populating an electronic health record (EHR);

identifying a portion of the transcript associated with a particular category of relevance to the EHR;

aligning, by a sequence-to-sequence ML model, segments from the transcript with segments from the model-generated summary; and identifying, within the portion of the transcript, content omitted from the model-generated summary based upon, at least in part, the aligned segments from the transcript and the model-generated summary, the content omitted from the model-generated summary being material to the EHR; and adjusting, via an iterative training process, the summarization ML model to account for the content omitted from the model-generated summary when generating future model-generating summaries, wherein the summarization ML model is configured to generate the future model-generated summaries for use in populating EHRs.

16. The computer program product of claim 15, wherein identifying the portion of the transcript associated with the particular category includes labeling each portion of the transcript associated with the particular category.

17. The computer program product of claim 15, wherein aligning the segments from the transcript with the segments from the model-generated summary includes training a sequence-to-sequence model with a training transcript and corresponding training summary.

18. The computer program product of claim 15, wherein aligning the segments from the transcript with the segments from the model-generated summary includes providing the transcript as input to an encoder of a sequence-to-sequence model and providing the model-generated summary to a decoder of the sequence-to-sequence model.

19. The computer program product of claim 18, wherein aligning the segments from the transcript with the segments from the model-generated summary includes generating an alignment score between a plurality of tokens of the transcript and a plurality of corresponding tokens of the model-generated summary based upon, at least in part, copy probabilities and attention weights between the plurality of tokens of the transcript and the plurality of corresponding tokens of the model-generated summary.

20. The computer program product of claim 19, wherein aligning the segments from the transcript with the segments from the model-generated summary includes generating an alignment score between segments of the transcript and corresponding tokens of the model-generated summary based upon, at least in part, a number of aligned tokens in each of the segments of the model-generated summary and a total number of tokens in each of the segments of the model-generated summary.

* * * * *